UNITED STATES PATENT OFFICE.

LEO H. BAEKELAND, OF NEW YORK, N. Y.

ANTISEPTIC COMPOUND.

SPECIFICATION forming part of Letters Patent No. 500,549, dated July 4, 1893.

Application filed June 27, 1892. Serial No. 438,193. (No specimens.)

*To all whom it may concern:*

Be it known that I, LEO H. BAEKELAND, a citizen of the Kingdom of Belgium, and a resident of the city, county, and State of New York, have invented certain new and useful Improvements in Compounds for Preserving Meat and Fish, of which the following is a specification.

In studying the antiseptic action of fluorid of sodium and fluorid of potassium on meat, fish and other perishable products, I discovered that these antiseptic properties of fluorid salts were specially useful for practical purposes when mixed with common salt or chlorid of sodium. In making a series of practical tests it was found that a mixture of fluorid of sodium or fluorid of potassium with salt in the proportion of eighty parts of the fluorid-salt to twenty parts of the chlorid-salt was the most advantageous; or, that a mixture of fluorid of sodium and fluorid of potassium in about equal proportion with twenty parts of chlorid of sodium gave also very satisfactory results. The above mixtures however may be varied to some extent according to the change in the conditions of the substances to be preserved. Another reason for preferring these mixtures in some cases is that the fluorid of sodium as well as the fluorid of potassium have no very high degree of solubility, while the mixture of both salts is more soluble and can therefore consequently be used to greater advantage when solutions of my preserving salt are required instead of using the same in powder form. The preserving-salt described can be used either in powder form or dissolved in water. When the meat or fish has to be preserved in large pieces, it is soaked for several hours in the solution of the fluorid-salt, so that the salt penetrates the body of the meat or fish. When the meat or fish has to be preserved for a short time only, the preserving-salt may be sprinkled over the same in powder form or applied in a saturated solution as a wash. As an auxiliary precaution, the barrels, tanks or boxes in which the preserved meat or fish are kept in stock or in which they are shipped should be washed with a solution of my preserving-salt. In this connection it may be stated that the combination of the fluorids with chlorid of sodium was not made haphazard, but intentionally and was the result of a series of experiments which were undertaken for studying the action of the fluorids on the digestive fluids. These experiments established the important fact, that these fluorids exert no injurious effects on the digestive fluids like other antiseptic substances and they differ thereby from the other antiseptic substances heretofore used. It was further discovered that the fluorids under certain circumstances increase the digestive action of ptyalin, pepsin and trypsin and that this beneficial action was further developed in the presence of a sufficient quantity of chlorid of sodium. The admixture of chlorid of sodium with the fluorids constitutes thereby a decided improvement in the manufacture of antiseptic substances: coagulated albumen, for instance to which about 0.02 per cent. of my preserving solution is added was quicker and easier dissolved, than the same albumen when used without any such solution. The characteristic feature therefore of my preservative compound consists in the fact, that it does not exert an injurious influence on the digestive fluids, but exerts on the contrary a beneficial effect on the same.

My improved preserving-salt has the following marked advantages as compared to the preserving-substances heretofore in use, namely, first, that a very effective preservation is obtained, secondly, that the preserving-salt can be furnished at a comparatively cheap price and can be cheaply, quickly and readily applied to the articles to be preserved, thirdly, that the fluorid of sodium or potassium can be used in the small quantities in which it is employed without exerting any injurious influence upon the human system.

Having thus described my invention, what I claim as new, and desire to secure by Letters Patent, is—

1. As a preservative for meat and fish, a mixture of fluorid of sodium and chlorid of sodium, substantially as herein set forth.

2. As a preservative for meat and fish, a mixture of fluorid of sodium, fluorid of potassium and chlorid of sodium, substantially as set forth.

In testimony that I claim the foregoing as my invention I have signed my name in presence of two subscribing witnesses.

LEO H. BAEKELAND.

Witnesses:
PAUL GOEPEL,
CHARLES SCHROEDER.